(12) United States Patent
Miura (10) Patent No.: US 7,949,456 B2
(45) Date of Patent: May 24, 2011

(54) TURNING CONTROL APPARATUS FOR VEHICLE

(75) Inventor: Takami Miura, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 535 days.

(21) Appl. No.: 11/713,005

(22) Filed: Mar. 2, 2007

(65) Prior Publication Data

US 2007/0222286 A1   Sep. 27, 2007

(30) Foreign Application Priority Data

Mar. 24, 2006  (JP) ................................. 2006-083693

(51) Int. Cl.
*B60T 8/34* (2006.01)
*B60T 7/12* (2006.01)
*B60T 8/24* (2006.01)
*B60K 28/16* (2006.01)

(52) U.S. Cl. ............. 701/72; 701/84; 180/197; 303/140

(58) Field of Classification Search .................... 701/38, 701/69, 72, 70, 41, 71, 84; 180/205, 206, 180/207, 315–336, 337–385; 280/5.507, 280/FOR. 133, 192, 11.204–11.217, 28.11, 280/264, 427, 428, 33.994, 124.105; 303/9.71, 303/167, 191, DIG. 2, DIG. 12
See application file for complete search history.

(56) References Cited

U.S. PATENT DOCUMENTS

| | | | | |
|---|---|---|---|---|
| 4,761,022 A | * | 8/1988 | Ohashi et al. ............... 280/5.504 |
| 4,790,404 A | * | 12/1988 | Naito ............................. 180/197 |
| 5,075,854 A | * | 12/1991 | Imaseki et al. .................. 701/36 |
| 5,276,624 A | * | 1/1994 | Ito et al. ........................... 701/72 |
| 5,376,868 A | * | 12/1994 | Toyoda et al. ................. 318/587 |
| 5,407,023 A | * | 4/1995 | Yamashita et al. ............ 180/197 |
| 5,842,754 A | * | 12/1998 | Sano .............................. 303/147 |
| 5,964,819 A | * | 10/1999 | Naito .............................. 701/72 |
| 6,282,478 B1 | * | 8/2001 | Akita .............................. 701/70 |
| 2002/0153770 A1 | * | 10/2002 | Matsuno et al. ............. 303/146 |
| 2008/0029328 A1 | | 2/2008 | Hoeck et al. |

FOREIGN PATENT DOCUMENTS

| | | |
|---|---|---|
| JP | 9-86378 A | 3/1997 |
| WO | WO-2006/029684 A1 | 3/2006 |

* cited by examiner

*Primary Examiner* — Jack Keith
*Assistant Examiner* — Muhammad Shafi
(74) *Attorney, Agent, or Firm* — Birch, Stewart, Kolasch & Birch, LLP (57) ABSTRACT

A turning control apparatus for a vehicle that improves turning ability while avoiding degradation of acceleration ability is provided.

The turning control apparatus comprises: a driving torque controller (31) for adjusting driving torque between a left and right wheels (14L and 14R); a unit (62) for calculating a necessary yaw momentum value indicating degree of necessary yaw momentum for the turning of the vehicle; and a clipping unit (63) for clipping the necessary yaw momentum value as a target yaw momentum at a maximum yaw momentum value, which is defined according to difference between rotation speeds of inside and outside wheels, if the necessary yaw momentum value is over the maximum yaw momentum value.

The controller adjusts driving torque of the left and right wheels to generate target yaw momentum at the vehicle corresponding to the target yaw momentum value obtained by the clipping unit.

5 Claims, 7 Drawing Sheets

FIG. 7

TURNING CONTROL APPARATUS FOR VEHICLE

BACKGROUND OF THE INVENTION (1) Field of the Invention

The present invention relates to a turning control apparatus for a vehicle.

(2) Description of Related Art

Techniques have been developed for improving safety of vehicles by achieving vehicle-stability during turning maneuvers. For example, the following related document 1 discloses generating yaw momentum of a vehicle based on the yaw-rate of the vehicle by controlling the difference in the driving torque between the left and right wheels to control the motion of the vehicle.

[Related Document 1] Japanese Laid-open Publication H09-86378

However, in reality, it is difficult to generate yaw momentum at a vehicle even if the driving torque difference between the left and right wheels is varied, because the capacity of traction (adhesive friction between the wheel and the road surface) is limited. The capacity of traction is also called as gripping capacity.

Particularly, to prevent over-steering owing to the technique of related document 1, the driving torque may be increased beyond the gripping capacity of the inside wheel. In this situation, it is difficult to run the vehicle in a straight line due to slip of the inside wheel, and then the degree of over-steering is increased in spite of adjusting the driving torque difference between the left and right wheels to prevent over-steering.

SUMMARY OF THE INVENTION

The present invention has been developed in consideration of this situation, and it is therefore an object of the invention to provide a turning control apparatus for a vehicle, which apparatus is capable of improving turning ability and operatability of the vehicle.

For this purpose, in accordance with an aspect of the present invention, there is provided a turning control apparatus for a vehicle comprising: a driving torque controller for adjusting driving torque between a left wheel and a right wheel; means for detecting turning direction of the vehicle; means for determining which of the left wheel and the right wheel is an inside-wheel or an outside-wheel according to the turning direction detected by the turning direction detecting means; means for sensing rotation speed of an inside-wheel which is opposite to the outside-wheel; means for sensing rotation speed of the outside-wheel; means for calculating a necessary yaw momentum value indicating degree of necessary yaw momentum for the turning of the vehicle; and means for clipping the necessary yaw momentum value as a target yaw momentum at a maximum yaw momentum value, which is defined according to difference between the inside-wheel rotation speed sensed by the inside-wheel rotation speed sensing means and the outside-wheel rotation speed sensed by the outside-wheel rotation speed sensing means, if the necessary yaw momentum value is over the maximum yaw momentum value; the driving torque controller adjusting between driving torque of the left wheel and the right wheel so as to generate target yaw momentum at the vehicle corresponding to the target yaw momentum value obtained by the necessary yaw momentum value clipping means.

According to the present invention, it is possible to improve turning ability and operatability of the vehicle by generating adequate yaw momentum owing to driving torque adjustment between a left wheel and a right wheel based on the rotation speed difference between the left and right wheels.

Further, it is possible to improve turning ability of the vehicle by generating yaw momentum corresponding to a brake yaw momentum value, which indicates an excess amount of the maximum yaw momentum value in the necessary yaw momentum value, owing to adjustment of the brake force of each wheel equipped with the vehicle.

Maximum yaw momentum value is decreased according to increments of the rotation speed of an inside wheel relative to the rotation speed of an outside wheel, it is possible to accurately set the maximum yaw momentum value without disturbance of road surface, and accordingly, the vehicle's turning ability is improved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DESCRIPTION OF THE INVENTION

The embodiment of the present invention will now be described with reference to the accompanying drawings.

Figure 1:
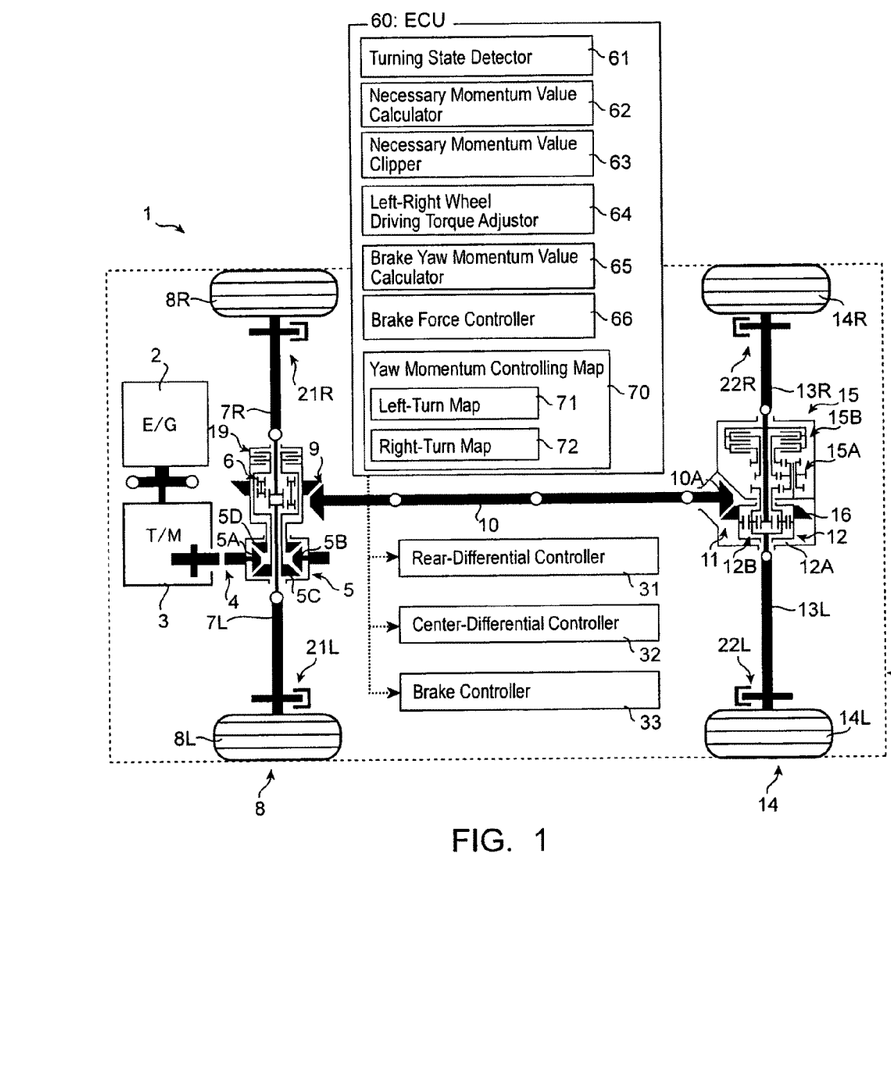
FIG. 1 is a block diagram schematically showing the entire organization of an embodiment of the present invention.

As shown in FIG. 1, an engine 2 is mounted on a vehicle 1. The torque output from the engine 2 is transmitted to a center differential 5 via transmission 3 and intermediate gear mechanism 4. The center differential 5 has a front-rear wheels limiting mechanism 19 which will be described later.

The output torque from the center differential 5 is individually transmitted to a front-right wheel 8R and a front-left wheel 8L via a front differential 6 and each of shafts 7L and 7R. The torque output from the differential 5 is individually transmitted to a rear-right wheel 14R and rear-left wheel 14L via a front-hypoid gear mechanism 9, a propeller shaft 10, a rear-hypoid gear mechanism 11, a rear-differential 12 and each of shafts 13R and 13L. The rear-differential 12 has a right-left wheel limiting mechanism 15 which will be described later.

The front-differential 6, so-called torque-sensing type of differential, can limit the speed difference mechanically between the right and left wheels 8R and 8L corresponding to the torque input from the engine 2.

The center differential 5 has differential pinions 5A and 5B, and side gears 5C and 5D engaging with the pinions 5A and 5B, respectively. The torque input from the differential pinions 5A and 5B is transmitted to the rear wheels 14. Further, the center differential 5 permits rotation of the front wheels 8 at a different speed from the rear wheels 14, and accordingly, the turning ability of the vehicle is secured.

The center differential 5 also has a front-rear wheel limiting mechanism 19 which can vary the degree of limitation of the speed differences between the front wheels 8 and the rear wheels 14, and can distribute variably the output torque from the engine 2 to each of the front wheels 8 and the rear wheels 14.

The front-rear wheel limiting mechanism 19 is a hydraulic multiple disk clutch that can vary the degree of limitation of speed differences between the front wheels 8 and the rear wheels 14 in response to varied oil pressure input from a driving oil pressure unit (not shown). Thus, the distributed torque is variably input to each of the front wheels 8 and rear wheels 14.

The oil pressure output from the driving oil pressure unit to the front-rear wheel limiting mechanism 19, being controlled by a center-differential controller 32, is described later.

As stated above, according to the front-rear wheel limiting mechanism 19, it is possible to improve the traction of the vehicle 1 by limiting the different speeds between the front wheels 8 and the rear wheels 14, and it is also possible to improve the turning ability of the vehicle 1 by not limiting the different speeds between the front wheels 8 and the rear wheels 14.

Each of the rear wheels 14R and 14L are connected to the rear-differential 12 including the right-left wheel limiting mechanism 15 for varying the difference of driving torque transmitted to each of the rear wheels 14R and 14L.

A left-rear rotation speed sensor (means for sensing rotation speed of an outside-wheel or means for sensing rotation speed of an inside-wheel; not shown) is equipped at the left-rear wheel 14L. A right-rear rotation speed sensor (means for sensing rotation speed of an outside-wheel or means for sensing rotation speed of an inside-wheel; not shown) is equipped at the right-rear wheel 14R.

Figure 5:
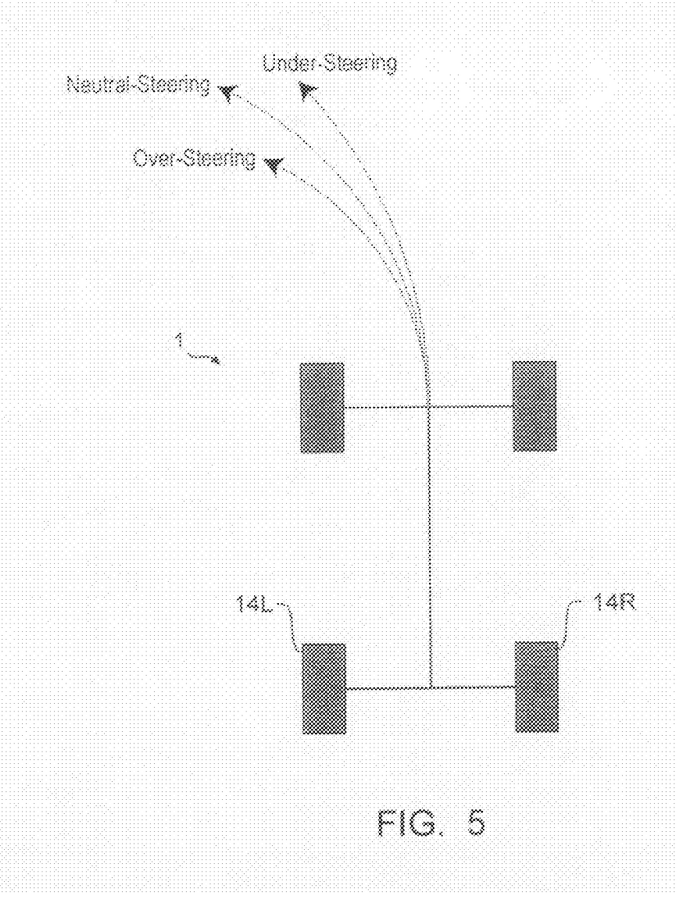
FIG. 5 is an schematic diagram showing a vehicle experiencing over-steering or under-steering.

As shown in FIG. 5, the embodiment of the present invention is described during a left turn by the vehicle 1. Accordingly, the left-rear wheel 14L is the inside-wheel and the right-rear wheel 14R is the outside-wheel. A turning state detector 61 in an ECU (Electronic Control Unit) 60, which will be described later, estimates that one of the left-rear wheel 14L or the right-rear wheel 14R corresponds to one of the inside-wheel or outside-wheel, and also estimates that another of the left-rear wheel 14L or the right-rear wheel 14R corresponds to another of the inside-wheel or outside-wheel.

The rear-differential 12 has a case 12A. A crown gear 16 is formed around the case 12A, and a planetary gear mechanism 12B is equipped inside the case 12A. The planetary gear mechanism 12B is for permitting the difference of speed between each of rear wheels 14R and 14L.

Namely, the planetary gear mechanism 12B enables transmission to the driving torque, which is input from the engine 2 to the crown gear 16 via the propeller shaft 10 and a pinion gear 10A, to each of the rear wheels 14R and 14L while not limiting the different speeds between the rear-right wheel 14R and the rear-left wheel 14L.

The right-left wheel limiting mechanism 15 includes a speed-varying mechanism 15A and a torque-transmitting mechanism 15B which can vary the output torque thereof. The right-left wheel limiting mechanism 15 is for varying, based on the signals from an ECU 60, the difference of torque between the right wheel 14R and the left wheel 14L corresponding to the driving conditions of the vehicle 1.

The speed-varying mechanism 15A varies the speed of rotation of rear left wheel 14L and outputs the torque to the torque-transmitting mechanism 15B.

The torque-transmitting mechanism 15B is a wet multiple-disk clutch which enables adjustment of the output torque based on the oil pressure input from the driving oil pressure unit.

As stated above, it is possible to vary individually the torque distributed to each of wheels 14R and 14L, using a technique that varies the speed of the rear-right wheel 14R with the speed-varying mechanism 15A and which adjusts the output torque using the torque-transmitting mechanism 15B. Hence the driving torque input to one of wheels 14R and 14L is increased or decreased by decreasing or increasing the other driving torque.

The planetary gear mechanism 12B, the speed-varying mechanism 15A and the torque-transmitting mechanism 15B are already known, therefore, description of these techniques is omitted in this embodiment.

The oil pressure input from the driving oil pressure unit to the right-left wheel limiting mechanism 15 is controlled by a rear-differential controller 31. The rear-differential controller 31 and control thereof will be described later.

The driving oil pressure unit (not shown) includes a not-shown accumulator, a motor pump for compressing the oil in the accumulator, and a pressure sensor for sensing the oil pressure resulting from compression by the motor pump. The driving oil pressure unit further includes a solenoid-controlled valve for adjusting the oil pressure in the accumulator generated by the motor pump and a pressure-direction valve for selectively supplying the oil pressure from an oil room (not shown) in the right-left wheel limiting mechanism 15 or another oil room (not shown) in the front-rear wheel limiting mechanism 19

The rear-differential controller 31 is an electrical control unit including a not-shown interface, memories and a CPU. The rear-differential controller 31 is for adjusting individual driving torque of the rear wheels 14R and 14L through the oil pressure unit in such a manner that the controller 31 sends a torque distribution signal to the driving oil pressure unit, which signal indicates the oil pressure corresponding to the difference in driving torque between the rear wheels 14R and 14L, and also the destination of the oil pressure, and then the controller 31 actuates the oil pressure unit to control the oil pressure supply to the right-left wheel limiting mechanism 15.

For example, as shown in FIG. 5, when the vehicle 1 turns left and runs forward, the rear-differential controller 31 controls the driving oil pressure unit so that the oil pressure is input to the right-left wheel limiting mechanism 15 of rear-differential 12 from the driving oil pressure unit.

When the driving torque transmitted to the left-rear wheel (inside-wheel) 14L is decreased, accordingly the driving torque of the left-rear wheel 14L is decreased and the rotation speed of the right-rear wheel 14R is increased.

Consequently, it is possible to avoid occurrence of under-steering owing to generation of the yaw momentum in a counterclockwise (left-turning) direction.

On the other hand, when the driving torque transmitted to the left-rear wheel 14L is increased, accordingly, the rotation speed of the left-rear wheel 14L is also increased. Still accordingly, the driving torque of the right-rear wheel 14R is decreased, consequently, the rotation speed of the right-rear wheel 14R is decreased.

Consequently, it is possible to avoid occurrence of over-steering owing to generation of the yaw momentum in a clockwise (right-turning) direction.

When the direction of yaw momentum is counterclockwise (left-turning), the yaw momentum value is positive. Likewise, when the direction of yaw momentum is clockwise (right-turning), the yaw momentum value is negative.

The center-differential controller 32, which is an electrical control unit, transmits a front-rear difference signal, which is a signal corresponding to a target speed deference between the front wheels 8 and the rear wheels 14, to the driving oil pressure unit so that the center-differential controller controls the degree of limitation for the differing speeds between the front wheels 8 and the rear wheels 14. The driving oil pressure unit varies the oil pressure input to the front-rear wheel limiting mechanism 19 at the center differential 5.

Each of wheels 8R, 8L, 14R and 14L are equipped with brakes 21R, 21L, 22R and 22L, individually. The brakes 21R, 21L, 22R and 22L are connected to a brake oil pressure unit (not shown) individually supplying the oil pressure to the brakes 21R, 21L, 22R and 22L.

Further, the vehicle 1 is equipped with a brake controller 33. The brake controller 33 is an electrical control unit including a not-shown interface, memories and a CPU.

The brake controller transmits a brake pressure signal, which is a signal corresponding to a target brake oil pressure to be increased or decreased at the individual brakes 21R, 21L, 22R and 22L, to the brake oil pressure unit so that the brake oil pressure unit varies the oil pressure input to each of the brakes 21R, 21L, 22R and 22L.

The brake oil pressure unit includes a motor pump and solenoid-controlled valves for a brake oil pressure system, and the unit inputs the oil pressure to the individual brakes 21R, 21L, 22R and 22L in response to orders from the brake controller.

As described above, each of the rear-differential controller (driving torque controller) 31, the center-differential controller and the brake controller 32 are individually controlled by the ECU 60.

The vehicle 1 has such not-shown sensors as a steering angle sensor, an longitudinal G sensor, a lateral G sensor, a yaw-rate sensor, wheel speed sensors and a vehicular velocity sensor.

The steering angle sensor senses the angle $\delta_{SW}$ of the steering wheel (not-shown) operated by a driver.

The longitudinal G sensor senses acceleration $G_X$ in a longitudinal direction at the vehicle 1. The lateral G sensor senses acceleration in a lateral direction at the vehicle 1.

The yaw-rate sensor senses acceleration in a rotational direction (namely yaw-rate) at the vehicle 1.

The vehicle 1 is equipped with ECU 60. The ECU 60 is an Electrical Control Unit including a not-shown interface, memories and a CPU, to which are input the results of sensing by the wheel speed sensors, the steering angle sensor, the longitudinal G sensor, the lateral G sensor, and the yaw-rate sensor.

The ECU 60 includes such program files stored in the memory (not shown) as a turning state detector (turning state detecting means) 61, a necessary momentum value calculator (necessary momentum calculating means) 62, a necessary momentum value clipper (necessary momentum value clipping means) 63, a left-right wheel driving torque adjustor (left-right wheel driving torque adjustment means) 64, a brake yaw momentum value calculator (brake yaw momentum value calculating means) 65 and a brake force controller 66.

In the memory of ECU 60, a driving torque distribution map (not-shown) and a yaw momentum controlling map 70 are stored. In the yaw momentum controlling map 70, a left-turn map 71 and a right-turn map 72 are stored.

The turning state detector 61 detects that the vehicle 1 is turning left if the lateral acceleration $G_Y$ read from the lateral G sensor is positive. Likewise, the turning state detector 61 detects that the vehicle 1 is turning right if the lateral acceleration $G_Y$ is negative.

Further, the turning state detector 61 estimates that the left-rear wheel 14L and the right-rear wheel 14R are the inside-wheel and the out-side wheel, respectively, if the turning state detector 61 detects that the vehicle 1 is turning left. Likewise, the turning state detector 61 estimates that the left-rear wheel 14L and the right-rear wheel 14R are the outside-wheel and the inside-wheel, respectively, if the turning state detector 61 estimates that the vehicle 1 is turning right.

The necessary yaw momentum value calculator 62 calculates the necessary yaw momentum value $YM_{ADD}$ indicating degree of necessary yaw momentum for the turning of the vehicle 1 to realize the driver's intended radius based on the steering angle $\delta_{SW}$ detected by the steering angle sensor and the vehicle's velocity $v_B$ detected by the vehicular velocity sensor. In other words, the necessary yaw momentum value $YM_{ADD}$ indicates degree of necessary yaw momentum for turning with neutral-steering. The necessary momentum value calculator 62 considers that the steering direction for turning left is positive ($+\delta_{SW}$) and that the steering direction for turning right is negative ($-\delta_{SW}$).

The necessary yaw momentum value clipper 63 obtains speed difference $v_{dif}$ by subtracting the rotation speed $v_{RL}$, which is sensed by a left-rear wheel rotation speed sensor (not shown) equipped with the left-rear wheel 14L, from the rotation speed $v_{RR}$, which is sensed by a right-rear wheel rotation speed sensor (not shown) equipped with the right-rear wheel 14R, as shown by the following formula (1). The necessary yaw momentum value clipper 63 clips the necessary yaw momentum value $YM_{ADD}$ clips at a maximum yaw momentum value $YM_{AYC-MAX}$ as a target yaw momentum value $YM_{AYC}$ based on the speed different $v_{dif}$.

$$v_{RR} - v_{RL} = v_{dif} \quad (1)$$

Figure 2:
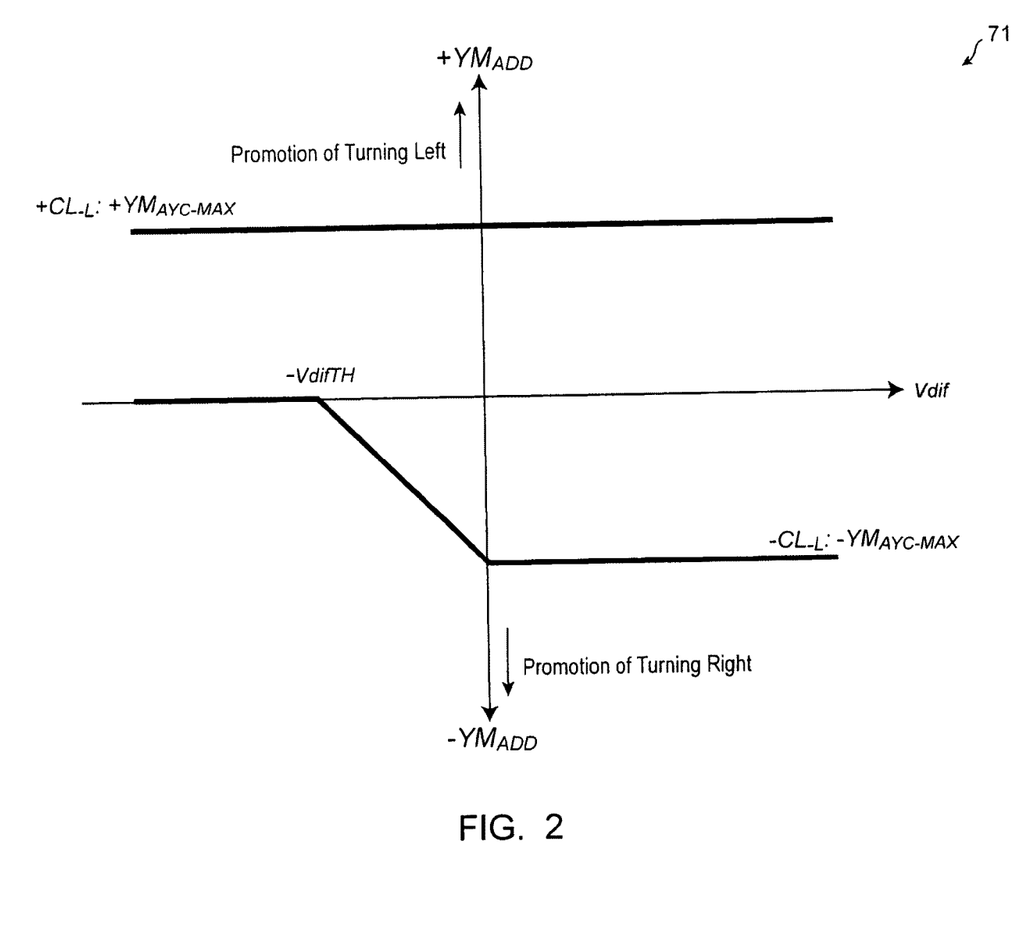
FIG. 2 is a graph schematically showing a left-turning map for the embodiment of the present invention.
Figure 3:
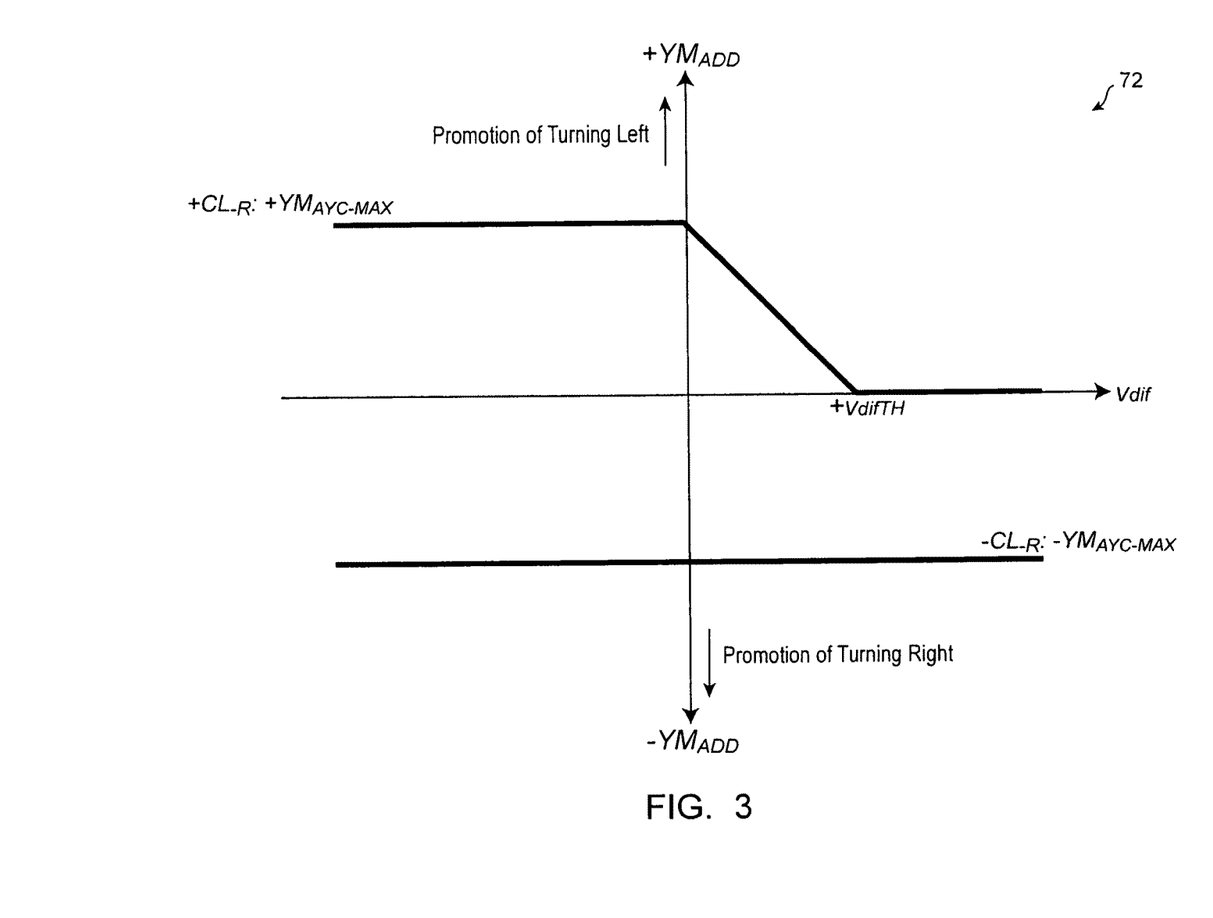
FIG. 3 is a graph diagram schematically showing a right-turning map for the embodiment of the present invention.

In detail, necessary momentum value clipper 63 chooses one of the left-turn map 71 and the right-turn map 72 according to the turning direction of the vehicle 1 detected by the turning state detector 61, and then obtains the target yaw momentum value $YM_{AYC}$ owing to application of the speed different $v_{dif}$, which is obtained by the formula (1) as above, to the left-turn map 71 or the right-turn map 72. The target yaw momentum value $YM_{AYC}$ indicates the target yaw momentum which should be generated owing to the driving torque adjustment by the right-left wheel limiting mechanism 15.

When the rotation speed $v_{RR}$ of the right-rear wheel 14R is faster than the rotation speed $v_{RL}$ of the left-rear wheel 14L (i.e. following formula (2) is established), the speed difference $v_{dif}$ is positive ($v_{dif} > 0$).

$$v_{RR} > v_{RL} \quad (2)$$

When the rotation speed $v_{RL}$ of the left-rear wheel 14L is faster than the rotation speed $v_{RR}$ of the right-rear wheel 14R (i.e. following formula (3) is established), the speed difference $v_{dif}$ is negative ($v_{dif} < 0$).

$$v_{RR} < v_{RL} \quad (3)$$

As shown in FIG. 2, on the left-turn map 71, the necessary yaw momentum value $\pm YM_{ADD}$ is defined as the vertical axis, the speed difference $v_{dif}$ is defined as the horizontal axis, and the maximum yaw momentum value (maximum value) $\pm YM_{AYC-MAX}$ is defined as clipping lines $\pm CL_{-L}$.

Likewise, as shown in FIG. 3, on the right-turn map 72, the necessary yaw momentum value $\pm YM_{ADD}$ is defined as the vertical axis, the speed difference $v_{dif}$ is defined as the horizontal axis, and the maximum yaw momentum value $YM_{AYC\text{-}MAX}$ is defined as clipping lines $\pm CL_{\text{-}R}$.

The left-turn map 71 shown in FIG. 2, the positive clipping line $+CL_{\text{-}L}$ is constant irrespective of the amount of the speed difference $v_{dif}$. Whereas, the negative clipping line $-CL_{\text{-}L}$ is varied gradually so as to be zero if the speed difference $v_{dif}$ is equal or smaller than zero. The negative clipping line $-CL_{\text{-}L}$ is constant at zero (i.e. $-YM_{AYC\text{-}MAX}=0$) if the speed difference $v_{dif}$ is smaller than a threshold value $-v_{difTH}$.

In the right-turn map 72 shown in FIG. 3, the negative clipping line $-CL_{\text{-}R}$ is constant irrespective of the amount of the speed difference $v_{dif}$. Whereas, the positive clipping line $+CL_{\text{-}R}$ is varied gradually so as to be zero if the speed difference $v_{dif}$ is equal or greater than zero. The positive clipping line $+CL_{\text{-}R}$ is constant at zero (i.e. $+YM_{AYC\text{-}MAX}=0$) if the speed difference $v_{dif}$ is greater than a threshold value $+v_{difTH}$.

The reason why the characteristic of the clipping line $-CL_{\text{-}L}$ is defined as shown in FIG. 2 will now be described.

Assuming that the vehicle 1 is turning left, generally, such relationship is established that the rotation speed $v_{RL}$ of the inside-wheel (left-rear wheel) 14L is slower than the rotation speed $v_{RR}$ of the outside-wheel (right-rear wheel) 14R. However, when the left-rear wheel 14L is slipping, the above relationship is not established.

In other words, by detecting that the rotation speed $v_{RL}$ of the inside-wheel 14L is faster than the rotation speed $v_{RR}$ of the outside-wheel 14R, it is also detected that the gripping capacity of the inside-wheel 14L is inadequate or that the capacity will be insufficient.

Further, it is estimated that the degree of slipping of the inside-wheel 14L is increased according to the increments of the relative difference between the rotation speed $v_{RR}$ of the outside-wheel 14L and the rotation speed $v_{RL}$ of inside-wheel 14L (i.e. according to the decrements of the speed difference $v_{dif}$ calculated by the formula (1)).

In this embodiment of the present invention, under the situation described above, it is assumed that as even the driving torque of the inside-wheel 14L is increased, it is difficult to generate the yaw momentum at the vehicle 1. Consequently, the negative clipping line $-CL_{\text{-}L}$ (i.e. $+YM_{AYC\text{-}MAX}$) is defined so as to gradually become zero.

When the speed difference $v_{dif}$ is smaller than the threshold value $-v_{difTH}$, it is assumed that even the driving torque of the inside-wheel 14L is increased, and it is substantially impossible to generate the yaw momentum at the vehicle 1. Consequently, the negative clipping line $-CL_{\text{-}L}$ (i.e. $+YM_{AYC\text{-}MAX}$) is defined so as to be constant at zero.

Explanation of the positive clipping line $+CL_{\text{-}R}$ defined on the right-turn map 72 shown in FIG. 3 is omitted because persons ordinarily skilled in the art may be able to easily understand the characteristic of the line $+CL_{\text{-}R}$ by referring to the explanation of the negative clipping line $-CL_{\text{-}L}$ defined on the left-turn map 71 as described above by substituting the turning direction of the vehicle 1 from the turn-right to the turn-left.

If the turning state detector 61 estimates that the vehicle 1 is turning "left", then the necessary yaw momentum value clipper 63 applies the speed difference $v_{dif}$ to the left-turn map 71. If the necessary yaw momentum value $YM_{ADD}$ is under the positive clipping line $+CL_{\text{-}L}$ and is over the negative clipping line $-CL_{\text{-}L}$ (i.e. following formula (4) is established), then the turning state detector 61 sets without modification the necessary yaw momentum value $YM_{ADD}$ as the target yaw momentum value $YM_{AYC}$.

$$-YM_{AYC\text{-}MAX} \leq YM_{ADD} \leq +YM_{AYC\text{-}MAX} \quad (4)$$

If the necessary yaw momentum value $YM_{ADD}$ is over the positive clipping line $+CL_{\text{-}L}$ (i.e. following formula (5) is established), then the necessary yaw momentum value clipper 63 clips the target yaw momentum value $YM_{ADD}$ at the positive clipping line $+CL_{\text{-}L}$ and sets necessary yaw momentum value $YM_{ADD}$ obtained by clipping as the target yaw momentum value $YM_{AYC}$. In other words, The necessary yaw momentum value clipper 63 sets the target yaw momentum value $YM_{AYC}$ so as to establish following formula (6).

$$YM_{ADD} > +YM_{AYC\text{-}MAX} \quad (5)$$

$$YM_{AYC} = +YM_{AYC\text{-}MAX} \quad (6)$$

If the necessary yaw momentum value $YM_{ADD}$ is under the negative clipping line $-CL_{\text{-}L}$ (i.e. if following formula (7) is established), then the necessary yaw momentum value clipper 63 clips the necessary yaw momentum value $YM_{ADD}$ at the negative clipping line $-CL_{\text{-}L}$ and sets target yaw momentum value $YM_{ADD}$ obtained by clipping as the target yaw momentum value $YM_{AYC}$. In other words, the necessary yaw momentum value clipper 63 sets the target yaw momentum value $YM_{AYC}$ so as to establish following formula (8).

$$YM_{ADD} < -YM_{AYC\text{-}MAX} \quad (7)$$

$$YM_{AYC} = -YM_{AYC\text{-}MAX} \quad (8)$$

On the other hand, If the turning state detector 61 estimates that the vehicle 1 is turning "right", then the necessary yaw momentum value clipper 63 applies the speed difference $v_{dif}$ to the right-turn map 72. If the necessary yaw momentum value $YM_{ADD}$ is under the positive clipping line $+CL_{\text{-}R}$ and is over the negative clipping line $-CL_{\text{-}R}$ (i.e. following formula (9) is established), then the turning state detector 61 sets without modification the necessary yaw momentum value $YM_{ADD}$, which is obtained by the necessary momentum value calculator 62, as the target yaw momentum value $YM_{AYC}$.

$$-YM_{AYC\text{-}MAX} \leq YM_{ADD} \leq \pm YM_{AYC\text{-}MAX} \quad (9)$$

If the necessary yaw momentum value $YM_{ADD}$ is over the positive clipping line $+CL_{\text{-}R}$ (i.e. following formula (10) is established), then The necessary yaw momentum value clipper 63 clips the necessary yaw momentum value $YM_{ADD}$ at the positive clipping line $+CL_{\text{-}R}$ and sets target yaw momentum value $YM_{ADD}$ obtained by clipping as the target yaw momentum value $YM_{AYC}$. In the other words, The necessary yaw momentum value clipper 63 sets the target yaw momentum value $YM_{AYC}$ so as to establish following formula (11).

$$YM_{ADD} > +YM_{AYC\text{-}MAX} \quad (10)$$

$$YM_{AYC} = +YM_{AYC\text{-}MAX} \quad (11)$$

If the necessary yaw momentum value $YM_{ADD}$ is under the negative clipping line $-CL_{\text{-}R}$ (i.e. if following formula (12) is established), then The necessary yaw momentum value clipper 63 clips the necessary yaw momentum value $YM_{ADD}$ at the negative clipping line $-CL_{\text{-}R}$ and sets target yaw momentum value $YM_{ADD}$ obtained by clipping as the target yaw momentum value $YM_{AYC}$. In other words, The necessary yaw momentum value clipper 63 sets the target yaw momentum value $YM_{AYC}$ so as to establish following formula (13).

$$YM_{ADD} < -YM_{AYC\text{-}MAX} \quad (12)$$

$$YM_{AYC} = -YM_{AYC\text{-}MAX} \quad (13)$$

The left-right wheel driving torque adjustor 64 controls the right-left wheel limiting mechanism 15 so as to generate the yaw momentum corresponding to the target yaw momentum value set by the necessary yaw momentum value clipper 63.

The brake yaw momentum value calculator 65 sets a brake yaw momentum value $YM_{ASC}$ indicating excess amount of the maximum yaw momentum value (maximum value) $YM_{AYC\text{-}MAX}$ in the necessary yaw momentum value $YM_{ADD}$; and In other words, the brake yaw momentum value calculator 65 sets excess amount of the necessary yaw momentum value $YM_{ADD}$ as the brake yaw momentum value $+YM_{ASC}$ over the positive clipping line $+CL_{-L}$ as shown in FIG. 2. Likewise the brake yaw momentum value calculator 65 sets excess amount of the necessary yaw momentum value $YM_{ADD}$ as the brake yaw momentum value $-YM_{ASC}$ under the negative clipping line $-CL_{-L}$ as shown in FIG. 3.

The brake force controller 66 transmits to the brake controller 33 the signal for adjusting the brake force of each wheel 8L, 8R, 14L and 14R equipped with the vehicle 1 so as to generate brake yaw momentum corresponding to the brake yaw momentum value $YM_{ASC}$ set by the brake yaw momentum value calculator 65. The relationship between the brake yaw momentum value $YM_{ASC}$ and each of wheels 8L, 8R, 14L and 14R is stored in the memory of ECU 60.

Figure 4:
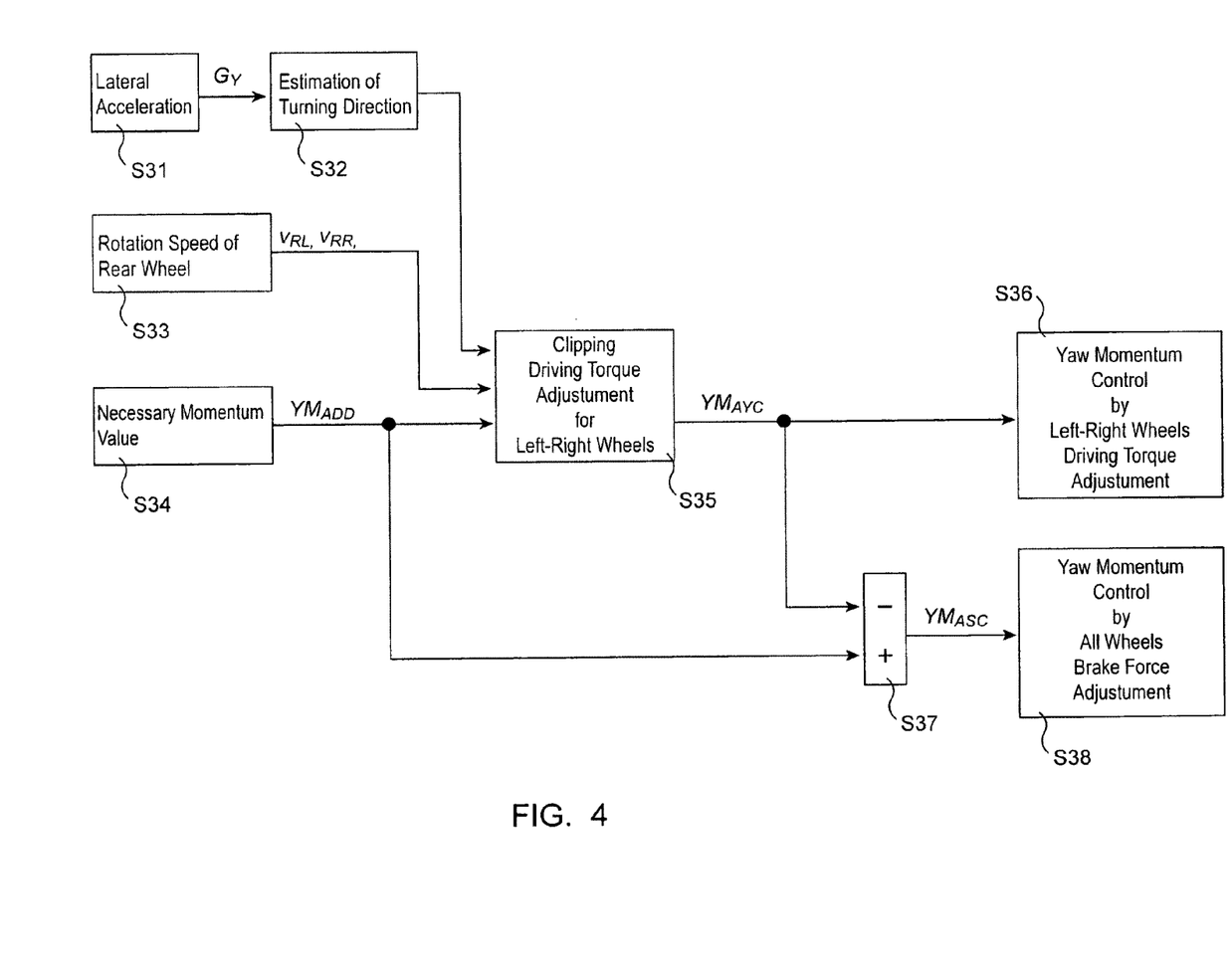
FIG. 4 is a block diagram schematically showing a manner of control in the embodiment of the present invention.

The principle of the this embodiment of the present invention will now be described with the control block diagram as shown in FIG. 4.

Firstly, ECU 60 reads the lateral acceleration $G_Y$ of the vehicle 1 from the lateral G sensor, and the turning state detector estimates the turning direction of the vehicle 1 (see S31 and S32 in FIG. 4). Further, the necessary momentum value calculator 62 calculates the necessary momentum value $YM_{ADD}$ (see S34 in FIG. 4).

Then the necessary yaw momentum value clipper 63 reads the rotation speed $v_{RL}$ of the left-rear wheel 14L and the rotation speed $v_{RR}$ of the right-rear wheel 14R (see S33 in FIG. 4), and calculates the speed difference $v_{dif}$.

Further, the necessary yaw momentum value clipper 63 executes a clipping control that is a control for clipping the necessary yaw momentum value $YM_{ADD}$ according to the speed difference $v_{dif}$. The target yaw momentum value $YM_{AYC}$, which indicates the amount of yaw momentum generated by the necessary yaw momentum value clipper 63, is also obtained (see S35 FIG. 4).

The brake yaw momentum value calculator 65 obtains the brake yaw momentum value $YM_{ASC}$ indicating deficient amount to fulfill the target yaw momentum value $YM_{AYC}$ by the necessary yaw momentum $YM_{AYC}$ (see S37 FIG. 4).

Then the left-right wheel driving torque adjustor 64 controls the right-left wheel limiting mechanism 15 so as to generate yaw momentum corresponding to the target yaw momentum value $YM_{AYC}$ set by the necessary yaw momentum value clipper 63. The brake force controller 66 controls each brake force of the wheels 8L, 8R, 14L and 14R (see S38 in FIG. 4). Accordingly, yaw momentum can be appropriately generated.

The operation and effect of the present invention of this embodiment will now be described as follows.

Assuming that the vehicle 1 is turning left as shown in FIG. 5.

Figure 6:
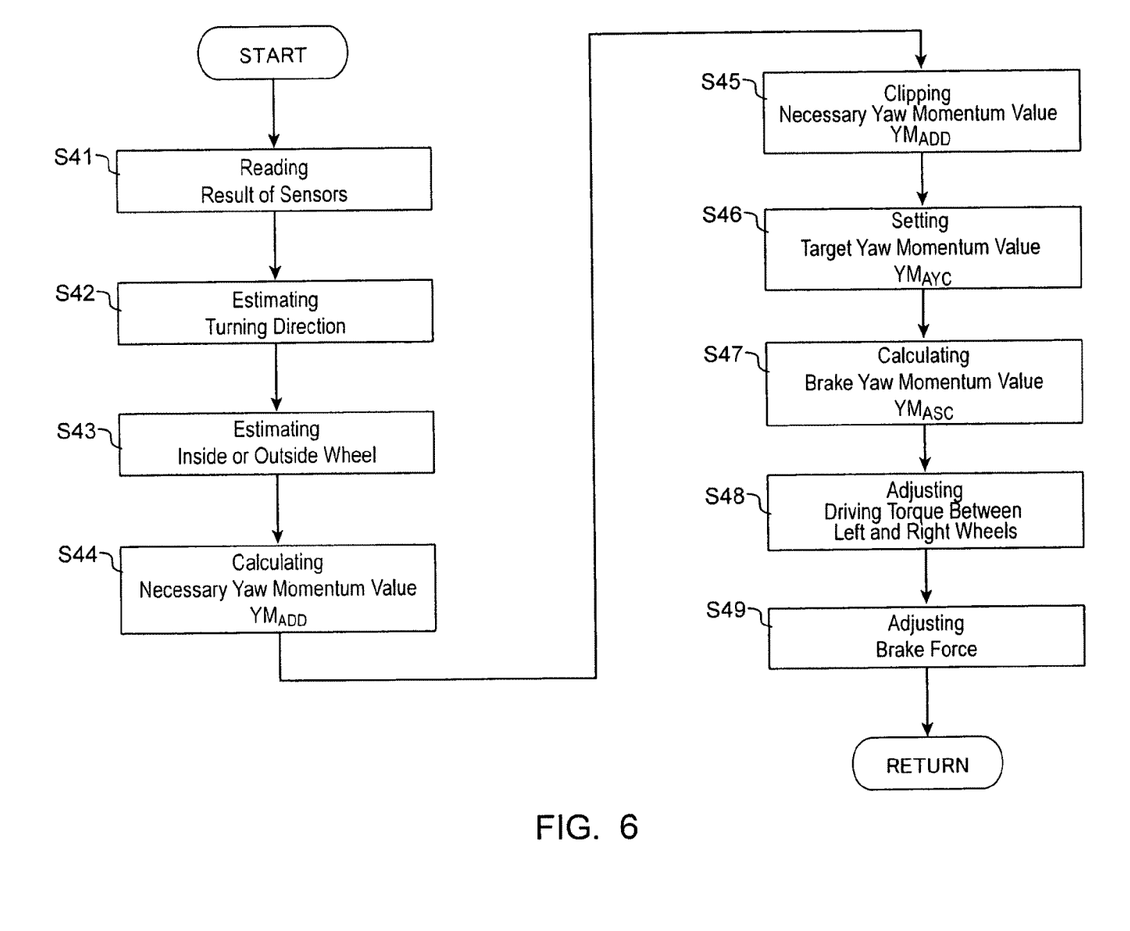
FIG. 6 is a flow chart schematically showing the control in the embodiment of the present invention.

At step S41 in FIG. 6, ECU 60 reads the longitudinal acceleration $G_X$ from the longitudinal G sensor, the lateral acceleration $G_Y$ from the lateral G sensor, and the angle $\delta_{SW}$ of the steering wheel from the steering angle sensor. The ECU 60 reads the vehicle's velocity $v_B$ from the vehicular velocity sensor, the rotation speed $v_{RL}$ of the left-rear wheel 14L from the left-rear wheel rotation speed sensor, and the rotation speed $v_{RR}$ of the right-rear wheel 14R from the right-rear wheel rotation speed sensor.

Then the turning state detector 61 of the ECU 60 estimates that the vehicle 1 is turning left if the lateral acceleration $G_Y$ of the vehicle 1 read from the lateral G sensor is positive. Whereas, the turning state detector 61 estimates that the vehicle 1 is turning right if the lateral acceleration $G_Y$ is negative. (step S42)

When it is estimated that vehicle 1 is turning left, the turning state detector 61 further designates the left wheels 8L and 14L as the inside-wheels and the right wheels 8R and 14R as the outside-wheels. On the other hand, when it is estimated that vehicle 1 is turning right, the turning state detector 61 further designates the right wheels 8R and 14R as the outside-wheels and the left wheels 8L and 14L as the inside-wheels. (step S43)

Then the necessary momentum value calculator 62 calculates the necessary yaw momentum value $YM_{ADD}$ based on the angle $\delta_{SW}$ of the steering wheel detected by the steering angle sensor, and the vehicle's velocity $v_B$ detected by the vehicular velocity sensor (step S44).

The necessary yaw momentum value clipper 63 clips the necessary yaw momentum value $YM_{ADD}$ as the target yaw momentum value $YM_{AYC}$ at the maximum yaw momentum value $\pm YM_{AYC\text{-}MAX}$ (steps S45 and S46). If the necessary yaw momentum value $YM_{ADD}$ is under the positive maximum yaw momentum value $+YM_{AYC\text{-}MAX}$ and over the negative maximum yaw moment value $-YM_{AYC\text{-}MAX}$, the necessary momentum value clipper 63 sets the necessary yaw momentum value $YM_{ADD}$ as the target yaw momentum value $YM_{AYC}$ without modification.

Then the brake yaw momentum value calculator 65 sets excess amount of the necessary yaw momentum value $YM_{ADD}$ as the brake yaw momentum value $+YM_{ASC}$ beyond the maximum yaw momentum value $+YM_{ASC}$, and also the brake yaw momentum value calculator 65 sets excess amount of the necessary yaw momentum value $YM_{ADD}$ as the brake yaw momentum value $-YM_{ASC}$ beyond the maximum yaw momentum value $-YM_{ASC}$. (step S47)

In other words, when under-steering occurs at the vehicle 1 turns left, the brake yaw momentum value calculator 65 sets the brake yaw momentum value $+YM_{ASC}$ in a counterclockwise direction to suppress the under-steering currently happening at the vehicle 1. Likewise, when over-steering occurs at the vehicle 1 turns left, the brake yaw momentum value calculator 65 sets the brake yaw momentum value $-YM_{ASC}$ in a clockwise direction to suppress the over-steering currently happening at the vehicle 1.

Next, the left-right wheel driving torque adjustor 64 adjusts the right-left wheel limiting mechanism 15 by transmitting the signal standing for the difference between the left-rear wheel 14L and right-rear wheel 14R to generate yaw momentum corresponding to the target yaw momentum value $YM_{AYC}$. (step S48)

The brake force controller 66 adjusts each of the individual brakes 21R, 21L, 22R and 22L by transmitting to the brake controller 33 the signal for adjusting the brake force of each wheel 8L, 8R, 14L and 14R to generate yaw momentum at the vehicle 1 corresponding to the brake yaw momentum value $YM_{ASC}$. (step S49)

As stated above, yaw momentum is generated (corresponding to the target yaw momentum value $\pm YM_{AYC}$) at the vehicle 1 owing to the right-left wheel limiting mechanism 15. Further, this yaw momentum is generated (corresponding to the brake yaw momentum value $\pm YM_{ASC}$) at the vehicle 1 due to the individual brakes 21R, 21L, 22R and 22L. Accordingly, it is possible to generate yaw momentum corresponding to the necessary yaw momentum value ±$YM_{ADD}$ so that the turning ability of the vehicle 1 is improved.

In view of another aspect, the operation and effect of the present invention of this embodiment will now be described with FIG. 7 as follows. The left-turn map 71 shown in FIG. 7 is identical with the left-turn map 71 shown in FIG. 2.

Assuming that the vehicle 1 is turning left, and the necessary yaw momentum value $YM_{ADD}$ is $-YM_{ADD1}$ in a counterclockwise direction calculated by the necessary momentum value calculator 62.

Figure 7:
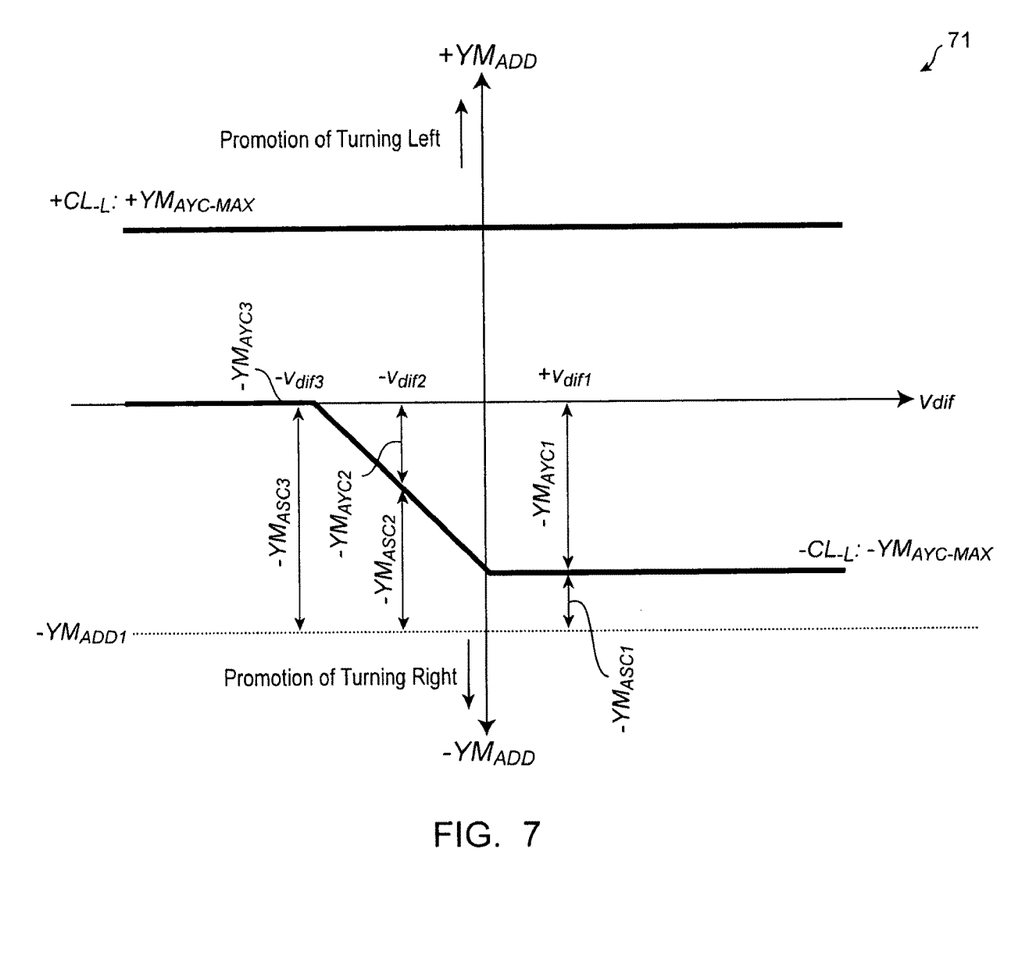
FIG. 7 is a graph schematically showing the left-turning map for the embodiment of the present invention.

As shown in FIG. 7, when the speed difference $v_{dif}$ is +$v_{dif1}$, the necessary yaw momentum value clipper 63 obtains a non-excess amount of the necessary yaw momentum value $-YM_{ADD1}$ beyond the maximum yaw momentum value $-YM_{AYC-MAX}$ (i.e. the value clipped at the negative clipping line $-CL_{-L}$) as the target yaw momentum $-YM_{AYC1}$.

At the same time, the brake yaw momentum value calculator 65 obtains an excess amount of the necessary yaw momentum value $-YM_{ADD1}$ beyond the maximum yaw momentum value $-YM_{AYC-MAX}$ (i.e. the value beyond the negative clipping line $-CL_{-L}$) as the brake yaw momentum $-YM_{ASC1}$.

On the other hand, when the speed difference $v_{dif}$ is $-v_{dif2}$, The necessary yaw momentum value clipper 63 obtains an excess amount of the necessary yaw momentum value $-YM_{ADD1}$ clipped at the negative clipping line $-CL_{-L}$ as the target yaw momentum $-YM_{AYC2}$. At the same time, the brake yaw momentum value calculator 65 obtains the value beyond the negative clipping line $-CL_{-L}$ as the brake yaw momentum $-YM_{ASC2}$.

On the left-turn map 71, the negative clipping line $-CL_{-L}$ is varied gradually so as to be zero if the speed difference $v_{dif}$ is equal or smaller than zero. Accordingly, as shown in FIG. 7, the amount of target yaw momentum value $-YM_{AYC1}$ (i.e. |$YM_{AYC1}$|) is smaller than the amount of target yaw momentum value $-YM_{AYC2}$ (i.e. |$YM_{AYC2}$|).

When the speed difference $v_{dif}$ is $-v_{dif3}$, the necessary yaw momentum value clipper 63 obtains the value clipped at the negative clipping line $-CL_{-L}$ as the target yaw momentum $-YM_{AYC3}$. The brake yaw momentum value calculator 65 obtains the value beyond the negative clipping line $-CL_{-L}$ as the brake yaw momentum $-YM_{ASC3}$.

On the left-turn map 71, the negative clipping line $-CL_{-L}$ is constant at zero (i.e. $-YM_{AYC-MAX}$=0) if the speed difference $v_{dif}$ is smaller than a threshold value $-v_{difTH}$. Accordingly, as shown in FIG. 7, the target yaw momentum value $-YM_{AYC3}$ is zero.

In other words, it is possible to consider that the inside-wheel 14L is slipping freely because the speed difference $v_{dif}$ is smaller than the threshold value $-v_{difTH}$ so the left-right wheel driving torque adjustor 64 does not activate the right-left wheel limiting mechanism 15. Accordingly, it is possible to enhance the slipping of the left-rear wheel 14L owing to the control of driving torque distribution between the left-rear wheel 14L and the right-rear wheel 14R not being executed.

Consequently, this embodiment of the present invention provides the following effects and/or advantages.

It is possible to improve the turning ability and operatability of the vehicle 1 owing to adjustment of the driving torque between the inside-wheel (14L or 14R) and the outside-wheel (14R or 14L) based on difference of rotation speed between the left-rear wheel 14L and right-rear wheel 14R.

Further, it is possible to enhance the turning ability of the vehicle 1 owing to individual adjustment of the brake force at the all wheels 8L, 8R, 14L and 14R.

It is possible to realize adjustment of the driving torque between the left-rear wheel 14L and right-rear wheel 14R by the right-left wheel limiting mechanism 15 owing to the processing load for ECU 60 being reduced because such control that sensing or estimating the friction coefficient μ of the road surface is not necessary.

Furthermore, it is possible to reduce the amount of heat generated from the brakes 21R, 21L, 22R and 22L because the brake force adjustment for the all wheels 8L, 8R, 14L and 14R is not executed when the yaw momentum at the vehicle 1 is generated sufficiently by the adjustment of the driving torque between the left-rear wheel 14L and the right-rear wheel 14R.

It is possible to reduce labor and costs for exchanging such expendable items as brake pads owing to prolonged life of expendable items because the load of brakes 21L, 21R, 22L and 22R due to repeated usage is reduced.

Further, it is possible to reduce the acceleration ability of the vehicle 1 owing to the repeated of execution of brake force adjustment for the wheels 8L, 8R, 14L and 14R.

As described above, the present invention is not limited to the above embodiment, but covers all changes and modifications which do not constitute departures from the spirit and scope of the invention.

In the above embodiment, the front differential 6 that is the torque-sensing type of differential that can mechanically limit the speed difference between the right and left wheels 8R and 8L corresponds to the torque input from the engine 2. However, it is acceptable to use other types of differential as the front differential 6.

Further, it is acceptable to apply the right-left wheel limiting mechanism 15 to not only the rear-differential 12 but also the front-differential 6.

Still further, in the above embodiment, the vehicle 1 is four-wheel-drive vehicle. It is also acceptable to apply the present invention to either a front-wheel drive vehicle or a rear-wheel drive vehicle.

Furthermore, in the above embodiment, the controller 31 controls the right-left wheel limiting mechanism 15 to adjust the individual driving torque output from the engine 2 to the rear wheels 14R and 14L, but the present invention is not limited to this configuration.

For example, it is acceptable to equip two motors connected to each of the right wheel and left wheel and to adjust the motor's torques, individually.

In this case, it is possible to equip further such driving sources as motors and/or engines at the vehicle.

Further, it is possible to adopt a mechanism to distribute the driving torque between the right and left wheels instead of the right-left wheel limiting mechanism 15. An example of such a mechanism may include clutch mechanisms at each of the right and left wheels to adjust the clutch pressures individually. Furthermore, it is also acceptable to equip a driving torque distribution mechanism at either of the front or rear wheels.

In the above embodiment, it is basically explained that when the vehicle 1 turns left, the left-rear wheel 14L and the right-rear wheel 14R are the inside-wheel and the outside-wheel, respectively. However, needless to say, the left-rear wheel 14L is the outside-wheel and the right-rear wheel 14R is the inside-wheel when the vehicle 1 turns right.

Further, in the above embodiment, the turning state detector 61 estimates the turning direction of the vehicle 1 based on the lateral G sensor. However the present invention is not limited to the above embodiment, it is possible to adopt any techniques for detecting the turning direction of the vehicle 1. For example, it is possible to estimate the turning direction of the vehicle 1 based on the sensing result of the yaw rate sensor. If the vehicle 1 has a navigation system, it is possible to estimate the turning direction based on the map information and the location of the vehicle 1 used in the navigation system.

What is claimed is:

1. A turning control apparatus for a vehicle, comprising:
   a driving torque controller for adjusting driving torque between a left wheel and a right wheel;
   a brake force controller for individually adjusting brake force of each wheel of the vehicle;
   means for detecting turning direction of the vehicle;
   means for determining which of the left wheel and the right wheel is an inside-wheel or an outside-wheel according to the turning direction detected by said turning direction detecting means;
   means for sensing rotation speed of the inside-wheel which is opposite to the outside-wheel;
   means for sensing rotation speed of the outside-wheel;
   means for calculating a necessary yaw momentum value indicating degree of necessary yaw momentum for the turning of the vehicle;
   a yaw momentum controlling map having a left-turn map and a right-turn map;
   means for clipping the necessary yaw momentum value as a target yaw momentum at a maximum yaw momentum value if the necessary yaw momentum value is over the maximum yaw momentum value, the maximum yaw momentum value being set according to a difference between the inside-wheel rotation speed and the outside-wheel rotation speed by applying the difference between the inside-wheel rotation speed and the outside-wheel rotation speed to the left-turn map or the right-turn map which is selected based on the turning direction of the vehicle; and
   means for calculating a brake yaw momentum value as the difference between the necessary yaw momentum value and the maximum yaw momentum value when the necessary yaw momentum value is over the maximum yaw momentum value,
   said necessary yaw momentum value clipping means, if the inside-wheel rotation speed is faster than the outside-wheel rotation speed, decreases the maximum yaw momentum value according to increments of the inside-wheel rotation speed relative to the outside-wheel rotation speed until the difference between the inside-wheel rotation speed and the outside-wheel rotation speed becomes equal to a differential speed threshold value, and sets the maximum yaw momentum value to zero when the difference between the inside-wheel rotation speed and the outside-wheel rotation speed is higher than or equal to the differential speed threshold value,
   said driving torque controller adjusting between driving torque of the left wheel and the right wheel to generate target yaw momentum at the vehicle corresponding to the target yaw momentum value obtained by said necessary yaw momentum value clipping means, and
   said brake force controller adjusting brake force of each wheel of the vehicle so as to generate brake yaw momentum corresponding to the brake yaw momentum value calculated by said brake yaw momentum value calculating means.

2. A turning control apparatus for the vehicle according to claim 1, wherein
   when said necessary yaw momentum value calculating means calculates the necessary yaw momentum value that must be reached to prevent under-steering,
   said necessary yaw momentum clipping means set constant at the maximum yaw momentum value,
   when said necessary yaw momentum value calculating means calculates the necessary yaw momentum value that must be reached to prevent over-steering,
   said necessary yaw momentum clipping means varies the maximum yaw momentum value according to the differential rotation speed between the inside-wheel rotation speed and the outside-wheel rotation speed.

3. A turning control apparatus for the vehicle according to claim 1, wherein
   when the outside-wheel's rotation speed is faster than the inside-wheel's rotation speed,
   said necessary yaw momentum clipping means sets the maximum yaw momentum value to be constant,
   when the inside-wheel's rotation speed is faster than the outside-wheel's rotation speed,
   said necessary yaw momentum clipping means varies the maximum yaw momentum value according to the differential rotation speed between the inside-wheel rotation speed and the outside-wheel rotation speed.

4. A turning control apparatus for the vehicle according to claim 1, wherein
   when the inside-wheel's rotation speed is faster than the outside-wheel's rotation speed,
   said necessary yaw momentum clipping means sets the maximum yaw momentum value to be smaller than when the outside-wheel's rotation speed is faster than the inside-wheel's rotation speed.

5. A turning control apparatus for the vehicle according to claim 1, wherein the means for calculating a necessary yaw momentum value calculates the necessary yaw momentum value based on a vehicle speed and a steering angle.

* * * * *